(12) United States Patent
Tsuji et al.

(10) Patent No.: US 8,851,911 B2
(45) Date of Patent: Oct. 7, 2014

(54) CARD CONNECTOR

(75) Inventors: Junya Tsuji, Tokyo (JP); Tatsuki Watanabe, Kanagawa (JP); Yuki Kudo, Kanagawa (JP)

(73) Assignee: Tyco Electronics Japan G.K., Kanagawa-ken (JP)

( * ) Notice: Subject to any disclaimer, the term of this patent is extended or adjusted under 35 U.S.C. 154(b) by 104 days.

(21) Appl. No.: 13/618,409

(22) Filed: Sep. 14, 2012

(65) Prior Publication Data

US 2013/0065411 A1    Mar. 14, 2013

(30) Foreign Application Priority Data

Sep. 14, 2011  (JP) ................................ 2011-200506

(51) Int. Cl.
*H01R 13/62*    (2006.01)
*G06K 13/08*    (2006.01)

(52) U.S. Cl.
CPC .................................. *G06K 13/0831* (2013.01)
USPC ........................................................... 439/159

(58) Field of Classification Search
CPC .. H01R 13/629; H01R 13/633; H01R 13/635; H01R 13/62905; H01R 13/6275; G06K 13/0831; G06K 13/0837; G06K 13/0806

USPC ........................................ 439/157, 159, 630
See application file for complete search history.

(56) References Cited

U.S. PATENT DOCUMENTS

| | | | |
|---|---|---|---|
| 6,360,091 B1 * | 3/2002 | Schellinger et al. .......... | 455/403 |
| 6,814,596 B2 * | 11/2004 | Yu et al. ........................ | 439/159 |
| 7,118,395 B2 * | 10/2006 | Tsuji ............................. | 439/159 |
| 7,192,292 B1 * | 3/2007 | Su ................................. | 439/159 |
| 7,326,085 B2 | 2/2008 | Takai et al. | |
| 8,152,541 B2 * | 4/2012 | Sakiyama et al. ............ | 439/138 |
| 8,500,469 B2 * | 8/2013 | Takai ............................ | 439/159 |
| 2006/0172603 A1 | 8/2006 | Matsumoto et al. | |
| 2007/0134965 A1 | 6/2007 | Takai et al. | |

OTHER PUBLICATIONS

Abstract for Japanese Patent Application 2005-50741(A), published Feb. 24, 2005, 2 pages.

* cited by examiner

*Primary Examiner* — Xuong Chung Trans
(74) *Attorney, Agent, or Firm* — Barley Snyder

(57) ABSTRACT

A card connector for receiving a card is provided. The card connector includes a housing a plurality of contacts, a slider and a stopper. The housing includes a front wall, a rear wall, and a card receiving passageway formed therein. The contacts are secured in the housing. The slider is positioned and slidable between the front wall and the rear wall. The stopper is supported by the slider and includes end sections positioned adjacent to the slider, such that a space is provided between one of the end sections and the slider.

17 Claims, 6 Drawing Sheets

(B)

(A)

CARD CONNECTOR

CROSS-REFERENCE TO RELATED APPLICATIONS

This application claims the benefit of the filing date under 35 U.S.C. §119(a)-(d) of Japanese Patent Application No. 2011-200506, filed Sep. 14, 2011.

FIELD OF THE INVENTION

The invention relates to an electrical connector and, in particular, to a card connector for a card having an integrated circuit (IC).

BACKGROUND

Card connectors for receiving a card having an integrated circuit (IC) contained therein and connecting the IC card to an electronic device, such as a mobile telephone are known.

For example, Japanese Patent Publication JP 2004-220787A discloses a known card connector having a card ejection mechanism, such as a push-push type. The known card connector includes a housing having a cavity into which a card is inserted and a cam slider provided in the cavity and is to be pushed by the card. Once the card is inserted, the card can be pushed again, and a lock for the slider is released and the card can be pushed out of the cavity by the slider. A rib is provided in the housing to guide the slider. In that known card connector, the rib abuts a front end of the card when the card is improperly inserted.

In addition, Japanese Patent Publication JP 2004-127731A discloses another known card connector having a card ejection mechanism of the push-push type. In that known card connector, a projection, for preventing improper insertion of a card, is arranged in a metal shell forming a cavity in connection with an insulating housing. The projection abuts a front end of an inserted card to prevent the card from being improperly inserted.

However, in the known card connector disclosed in Japanese Patent Publication JP 2004-220787A, the height of the rib is limited to the slider. In this case, when an improperly inserted card is pushed using a strong force, there is a possibility that the card may ride on the rib. As a result, the known card connector or the card may be damaged. Likewise, this problem may also occur with the known card connector having a projection for preventing an improper insertion in a metal shell of Japanese Patent Publication JP 2004-127731A.

SUMMARY

The present invention has been made in view of the above circumstances and provides a card connector capable of receiving a properly positioned card.

The card connector includes a housing a plurality of contacts, a slider and a stopper. The housing includes a front wall, a rear wall, and a card receiving passageway formed therein. The contacts are secured by the housing. The slider is positioned and slidable between the front wall and the rear wall. The stopper is supported by the slider and includes end sections positioned adjacent to the slider, such that a space is provided between one of the end sections and the slider.

BRIEF DESCRIPTION OF THE DRAWINGS

The features and advantages of the invention should become apparent from the following description when taken in conjunction with the accompanying drawings, in which.

DETAILED DESCRIPTION OF THE EMBODIMENT(S)

In the following, an exemplary embodiment of the invention will be described with reference to the drawings.

Figure 1:
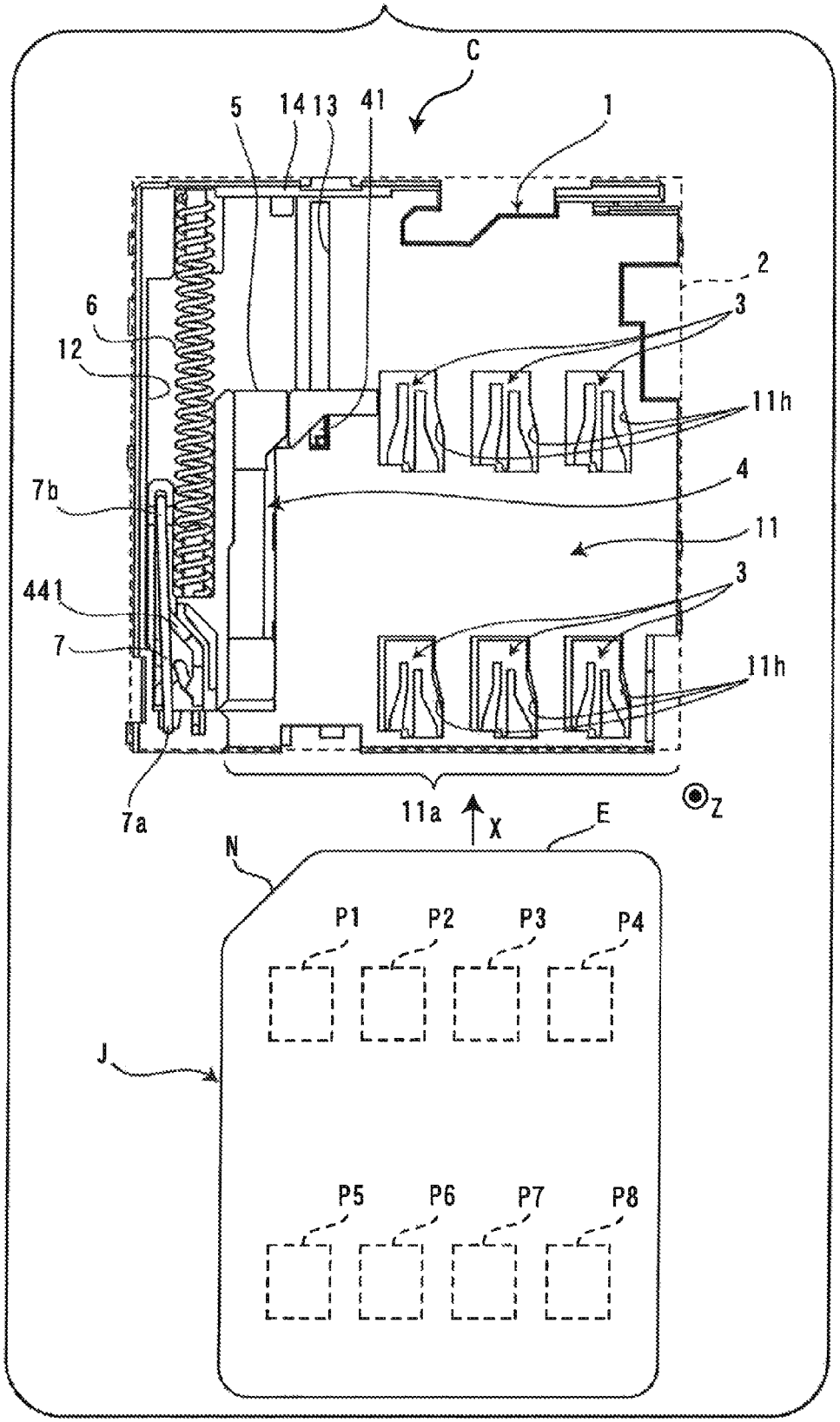
FIG. 1 is a plan view of a card connector according to the invention.

Now with reference to FIG. 1, a card connector C according to the invention is shown, as well as a card J to be connected to the card connector C. Here, the card J is an IC card having an IC included therein, for example, a micro SIM card.

A shown FIG. 1, the card J is positioned in the card connector C, with the direction of the card J being inserted into the card connector C in an insertion direction X. In the embodiment shown, the card J has a substantially rectangular plate shape and includes a notch N formed at either one of the left and the right of a leading edge E. Additionally, in the embodiment shown, the notch N is formed along a left corner of the card J, facing the card connector C, as shown in FIG. 1. As shown, the card J may be provided with eight contact pads P1-P8. The contact pads P1-P8 are arranged on a bottom surface, as shown in FIG. 1. Incidentally, in the embodiment shown, six of the eight contact pads P2-P4, P6-P8 are connectable to the card connector C.

The card connector C includes a housing 1, a shell 2, six contacts 3, a slider 4, a stopper 5, a coil spring 6, and a cam pin 7. Incidentally, FIG. 1 shows the card connector C in which the shell 2 is removed, and the shell is only shown as a broken line disposed along the housing 1.

In the embodiment shown, the housing 1 is formed by molding insulating material. The shell 2 is formed by stamping and forming a metal plate. Further in the embodiment shown, the housing 1 and the shell 2 are substantially rectangular. The shell 2 is attached to the housing 1 such that the shell 2 covers the housing 1. A card receiving passageway 11 receives the plate-shaped card J and is formed between the housing 1 and the shell 2. A card insertion passageway 11a is provided at one end of the card receiving passageway 11. The card J is inserted from the card insertion passageway 11a into the card receiving passageway 11 along the insertion direction X.

A height direction Z as described hereinafter is perpendicular to the insertion direction X and extends from the housing 1 to the shell 2, that is, into the page a as shown FIG. 1.

A restraining wall 14 to restrain the slider 4 or the stopper 5 is provided along another side of the card receiving passageway 11, opposite the card insertion passageway.

The contacts 3 make electrical contact with the contact pads P2-P4, P6-P8 and are formed by stamping and forming a metal plate. The contacts 3 are secured in the housing 1 by insert molding or other technique known to the art. The housing 1 is provided with contact openings 11h and tips of the contacts 3 enter into the card receiving passageway 11 through the contact openings 11h. The other ends of the contacts 3 are connected to conductive traces of an electronic device (not illustrated) to which the card connector C is attached. For instance, the contacts 3 may be soldered to the traces of the electronic device.

The slider 4, the stopper 5, the coil spring 6 and the cam pin 7 are arranged in the housing 1, along the card receiving passageway 11. The slider 4, the stopper 5, the coil spring 6 and the cam pin 7 provide a push-push type eject mechanism. The slider 4 is slidably supported by the housing 1. More specifically, a standing wall 12 extending along the insertion direction X and toward the restraining wall 14 is provided on an edge on a side of the housing 1 where the slider 4 is arranged. In addition, the housing 1 is provided with a guide groove 13 extending along the insertion direction X and toward the restraining wall 14. A projection 41 is included in the slider 4 and enters the guide groove 13. The slider 4 is guided by the standing wall 12 and the guide groove 13 of the housing 1 such that the slider 4 moves along the insertion direction X and toward the restraining wall 14.

Figure 2:
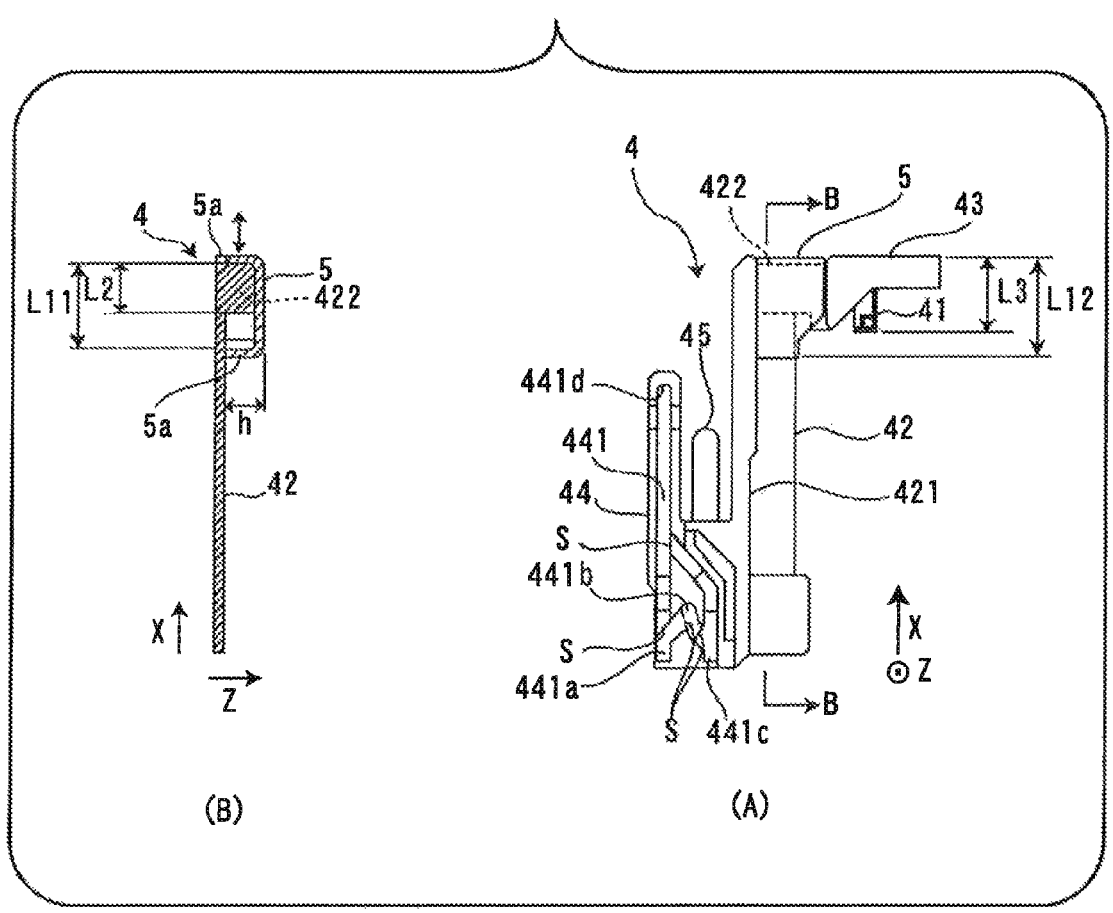
FIG. 2A is a plan view of a slider and a stopper of the card connector according to the invention.
FIG. 2B is a section view of the card connector shown in FIG. 2A, taken along line B-B.

Now with reference to FIGS. 2A and 2B, the slider 4 and the stopper 5 for the card connector C according to the invention are shown.

The slider 4 is formed by molding insulative material. The slider 4 includes a slider main body 42, a push section 43, a cam section 44 and a spring engaging section 45.

Referring again to FIG. 2, The slider main body 42 extends along the insertion direction X and toward the restraining wall 14. The slider main body 42 is provided with a guide wall 421 projecting in the height direction Z. The guide wall 421 has a height corresponding to the thickness of the card J and extends along the insertion direction X toward the restraining wall 14. The guide wall 421 makes contact with a side edge of the card J to guide the card J when the card J is inserted into the card receiving passageway 11.

The push section 43 extends from the from the slider main body 42 and has a hook shape in the embodiment shown. The push section 43 faces and abuts the front end E (see FIG. 1). The push section 43 has a height corresponding to the thickness of the card J. When the push section 43 is pushed by the card J (see FIG. 1), the slider 4 moves away from the card insertion passageway 11a and toward the restraining wall 14, deep inside the card receiving passageway 11. Conversely, when the slider 4 moves in a direction opposite the insertion direction X, the slider 4 urges the card J with the push section 43.

The cam section 44 is continuous with the slider main body 42. A cam follower 441 is formed in the cam section 44. The cam follower 441 is approximately heart shaped in the embodiment shown. The cam follower 441 includes four positioning points: (1) a first limitation position point 441a, a lock position point 441b, a second limitation position point 441c and an ejection position point 441d.

A tip of the cam pin 7 (see FIG. 1) enters the cam follower 441, and the cam follower 441 positions the slider 4 in cooperation with the cam pin 7. Steps S define movement of the cam pin 7 between the above-described four position points in the cam follower 441. For this reason, as the slider 4 moves, the cam follower 441 circularly guides the cam pin 7 (see FIG. 7) to the first limitation position point 441a, the lock position point 441b, the second limitation position point 441c and the ejection position point 441d in this order.

The spring engaging section 45 is a projection to which one end of the coil spring 6 (see FIG. 1) is attached. The coil spring 6 will be described later.

The stopper 5 is disposed along the slider main body 42 where the push section 43 projects. The stopper 5 is formed by stamping and forming a metal plate. Specifically, as shown FIG. 2B, the stopper 5 is substantially U-shaped with a pair of end sections 5a. The stopper 5 straddles the slider 4. More specifically, the stopper 5 straddles the stopper support section 422 formed in the slider 42. A length L11 along the insertion direction X is larger than a length L2 along the insertion direction X. Therefore, the stopper 5 is supported by the slider 42, but with some space between the stopper 5 and the stopper support section 422 along the insertion direction X. Like the push section 43 and the guide wall 421, the end section 5a has a height corresponding to the thickness of the card J.

The coil spring 6 is a compression spring arranged between the housing 1 and the spring engaging section 45 of the slider 4. The coil spring 6 is an example of the urging member according to the invention. The coil spring 6 urges the slider 4 away from the restraining wall 14, opposite the insertion direction X to eject the card J from the card receiving passageway 11.

The cam pin 7 is a rod that is substantially U-shaped in the embodiment shown, having both end portions bent at approximately right angles. The cam pin 7 is made by forming a metal rod. A first bent end 7a of the cam pin 7 is inserted in the housing 1, and the cam pin 7 is rotatably supported by the housing 1 about the one first bent ends 7a along an axis. A second bent end 7b of the cam pin 7 fits in the cam follower 441 of the slider 4. The cam pin 7 positions the slider 4 in cooperation with the cam follower 441.

In the card connector C having the above-described configuration, an improper insertion of the card J is prevented. Next, initial insertion of the card J will be described.

Figure 3:
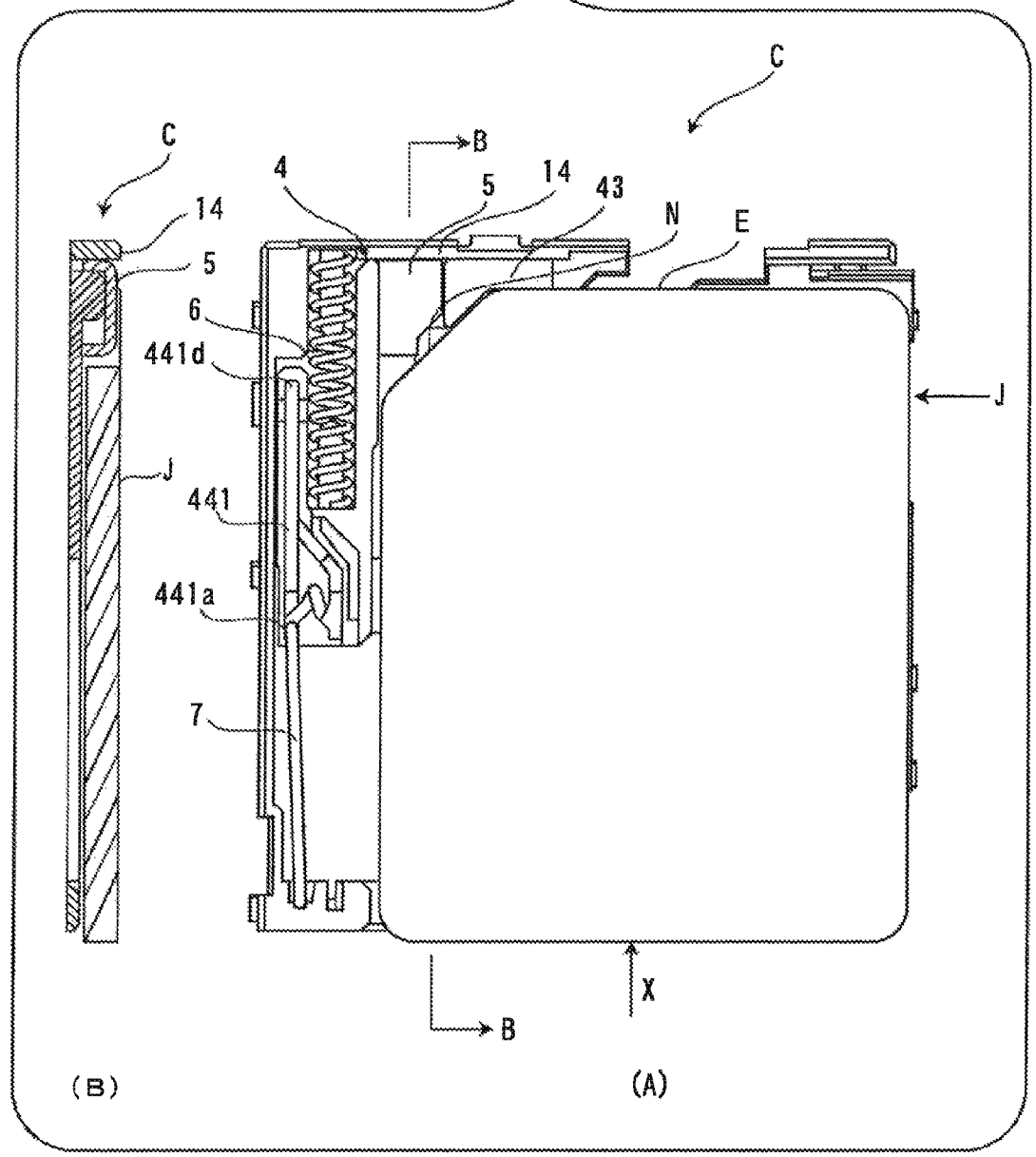
FIG. 3A is a plan view of the card connector according to the invention in which a card is inserted into the card connector.
FIG. 3B is a section view of the card connector shown in FIG. 3A, taken along line B-B.

FIG. 3 shows a card J properly inserted into the card connector C according to the invention. When the card J is properly inserted into the card receiving passageway 11 (see FIG. 1), the front end E of the card J abuts the push section 43 of the slider 4. Then, the slider 4 is pushed by the front end E and is urged away from the card insertion passageway 11a and toward the restraining wall 14. The slider 4 is urged against the coil spring 6, which applies a force against the slider 4. At this moment, the stopper 5 is also urged by the slider 4 away from the card insertion passageway 11a and further toward the restraining wall 14. A part of the stopper 5 enters the notch N. For this reason, the slider 4 may move to a position where the push section 43 bumps against the restraining wall 14 without an interference of the stopper 5 as shown in FIG. 3. FIG. 3 illustrates when the slider 4 moves further away from the card insertion passageway 11a and the push section 43 bumps against the restraining wall 14 so that further movement of the slider 4 in the insertion direction X is prevented. As the slider 4 moves, the cam pin 7 is guided from the ejection position point 441d to the first limitation position point 441a of the cam follower 441.

Next, when the force against the card J is released, the coil spring 6 urges the slider 4 slightly toward the card insertion passageway 11a, that is, opposite the insertion direction X.

Figure 4:
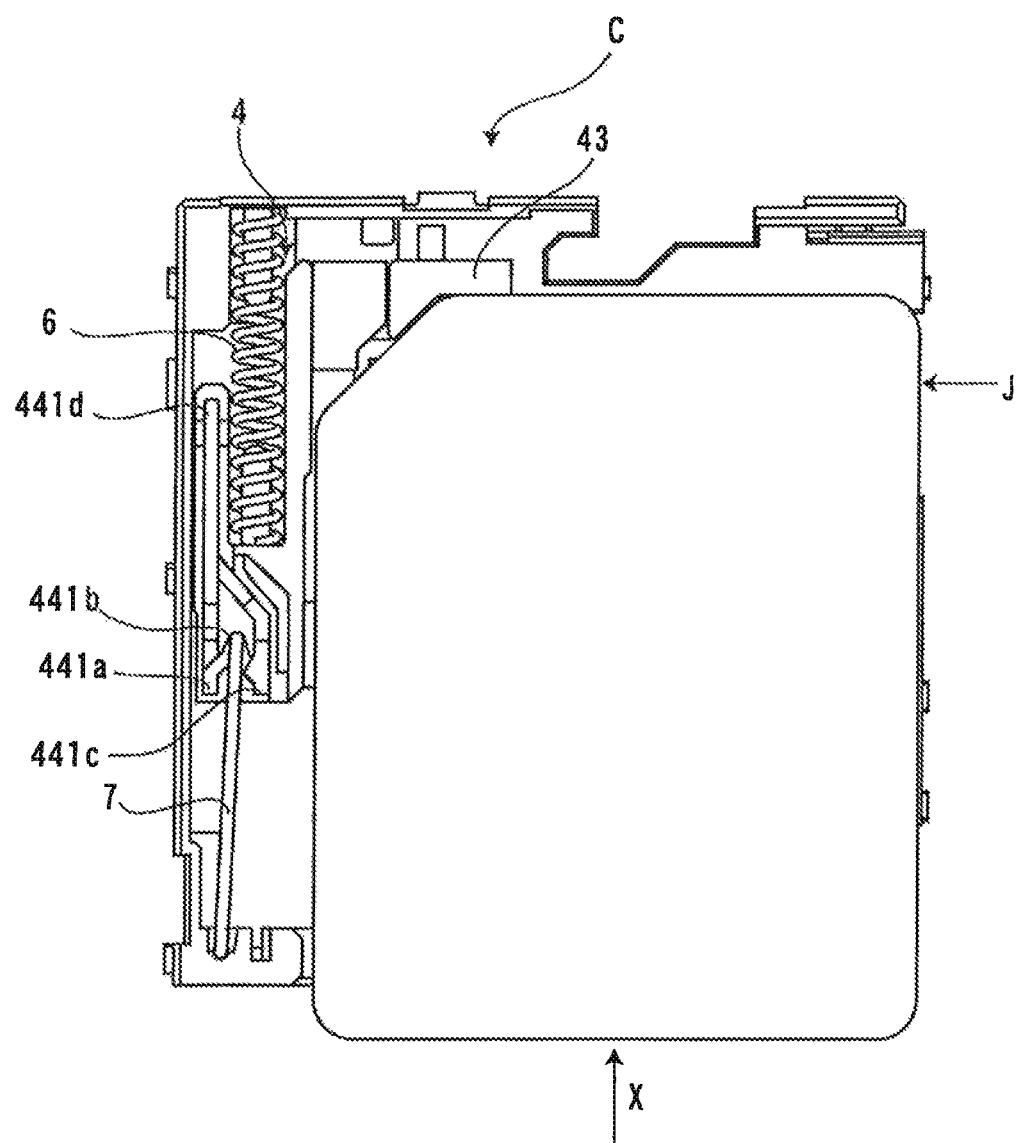
FIG. 4 is a plan view of the slider according to the invention in which the slider is locked by an inserted card when a card is properly inserted.

Now with reference to FIG. 4, the slider 4 is shown in a locked position. When the card J is released and the slider 4 moves under force from the coil spring 6, the cam pin 7 which is at the first limitation position point 441a now enters the lock position point 441b. The cam pin 7 entering the lock position point 441b prevents further movement of the slider 4. The card J stops at a position shown in FIG. 4. The position of the slider 4 in which the cam pin 7 enters the lock position point 441b is also referred to as a locked position. At the locked position, the card J becomes completely attached to the card connector C. At the locked position, the tips of the contacts 3 (see FIG. 1) of the card connector C elastically e contact the contact pads P2-P4 and P6-P8 (see FIG. 1).

Next, if a force is again applied to the card J when the slider 4 is at the lock position, the card J pushes the slider 4 along the insertion direction X toward the restraining wall 14, against the spring force of the coil spring 6. The slider 4 moves until the push section 43 bumps against the restraining wall 14. In addition, as the slider 4 moves, the cam pin 7 is guided from the lock position point 441b to the second limitation position point 441c of the cam follower 441.

Next, when the force against the card J is again released, the slider 4 moves toward the card insertion passageway 11a, that is, the direction opposite to the insertion direction X by the spring force of the coil spring 6. In addition, the cam pin 7 is guided from the second limitation position point 441c to the ejection position point 441d of the cam follower 441. Thus, the slider 4 pushes the card J out while moving up to the ejection position shown in FIG. 1. The slider 4 moves up to the ejection position so that much of the card J is exposed out of the card connector C. Accordingly, it is possible for a user to grab and remove the card J.

Next, with reference to FIG. 5A and 5B, operation of the card connector C and aforementioned elements will be described when a card J is improperly inserted into the card connector C according to the invention.

The card J shown in FIG. 5A and 5B is reversed with respect to top and bottom and front and back. Thus, the contact pads P1-P8 are shown in solid lines. In addition, the front end E provided with the notch N is arranged opposite to the insertion direction X.

When the card J as positioned in FIG. 5A and 5B is inserted into the card connector C, the slider 4 is urged by the card J to move toward a midpoint along the insertion direction X. The notch N does not engage the stopper 5, but instead, the stopper 5 is also urged by the inserted edge card J. As described with reference to FIG. 2, the length L12 along the insertion direction X is larger than the length L3 along the insertion direction X. Thus, before the push section 43 of the slider 4 reaches the restraining wall 14, the stopper 5 bumps against the restraining wall 14. In other words, the card J is prohibited by the stopper 5 to cause the slider 4 to abut the restraining wall 14, into the deepest position of the housing 1 (see FIG. 3). FIGS. 5A and 5B show where the stopper 5 bumps against the restraining wall 14.

The stopper 5 according to the shown embodiment is has a U-shape with end sections 5a that straddle the slider 4, such that space is provided between the stopper 5 and the stopper support section 422 of the slider 4, and it moves together with the slider 4. For this reason, the end sections 5a bump against the card J, but do not pass the stopper support section 422. Accordingly, the height h (see FIG. 2) of the end sections 5a where the stopper 5 bumps against the card J may be a height corresponding to the thickness of the card J. For this reason, even if the card J is inserted by a strong force, the card J riding onto the stopper 5 is prevented, to avoid improper insertion of the card J. In addition, the stopper 5 is made of metal to further prevent damage when the card J is pushed in by a strong force.

Figure 5:
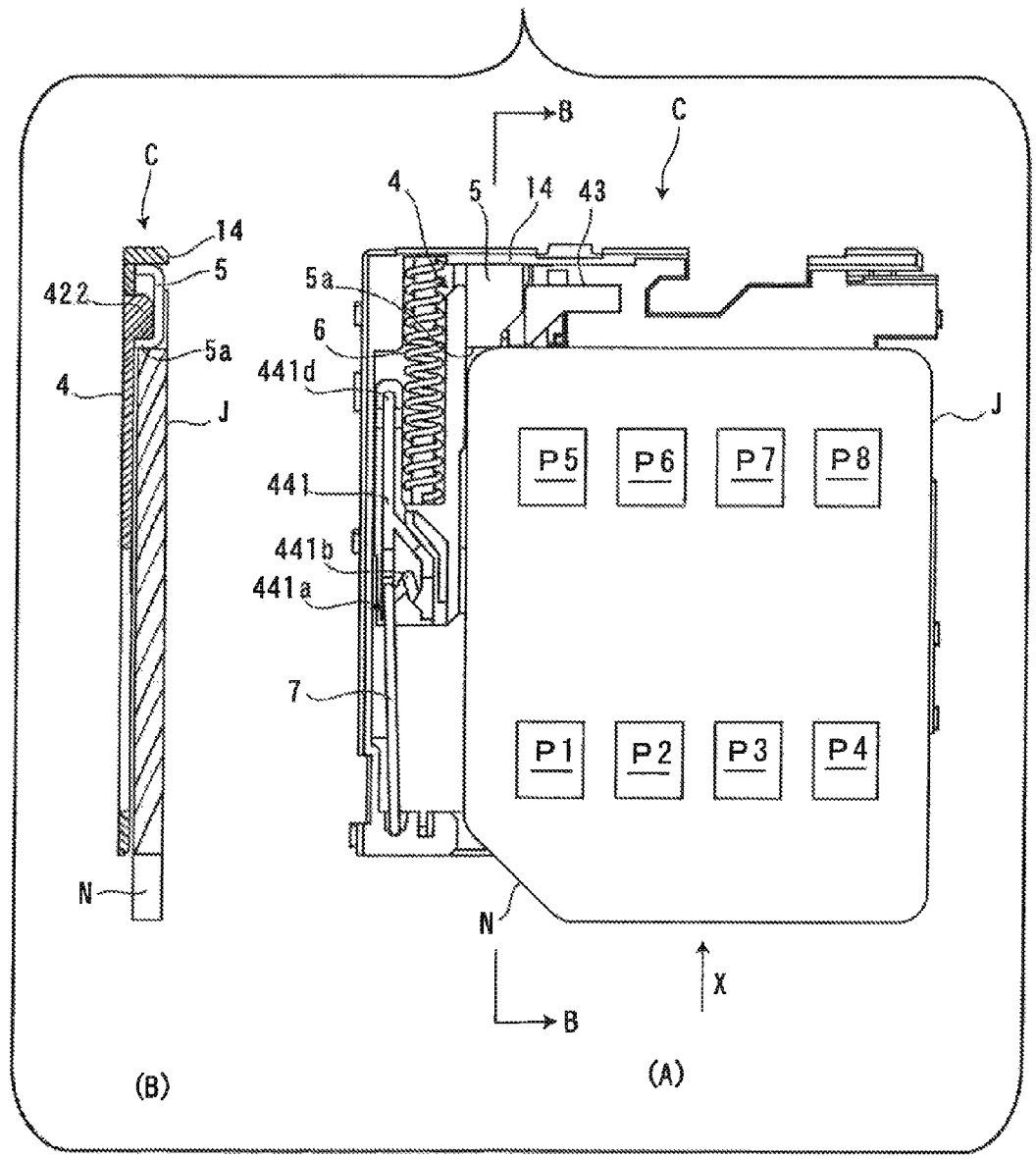
FIG. 5A is a plan view of the card connector according to the invention in which a card is improperly inserted.
FIG. 5B is a section view of the card connector shown in FIG. 5A.

As further shown in FIG. 5A and 5B, the cam pin 7 is moved away from the ejection position point 441d of the cam follower 441 as the slider 4 moves. However, the slider 4 is urged by the coil spring 6 and supports the stopper 5. For this reason, when the stopper 5 is pressed by the card J and bumps against the restraining wall 14 as shown in FIG. 5, the slider 4 stops moving along the insertion direction X to the deepest position of the housing 1 and against the restraining wall 14 (as shown in FIG. 3). In other words, the cam pin 7 does not reach the first limitation position point 441a. Having not reached the first limitation position point 441a, the cam pin 7 will not move to the next position, the lock position point when the card J is properly inserted in the card receiving passageway 11. For this reason, the pushing force against the card J is released and the slider 4 is moved by the force of the coil spring 6, and then the cam pin 7 returns up to the ejection position point 441d without entering the lock position point 441b.

Figure 6:
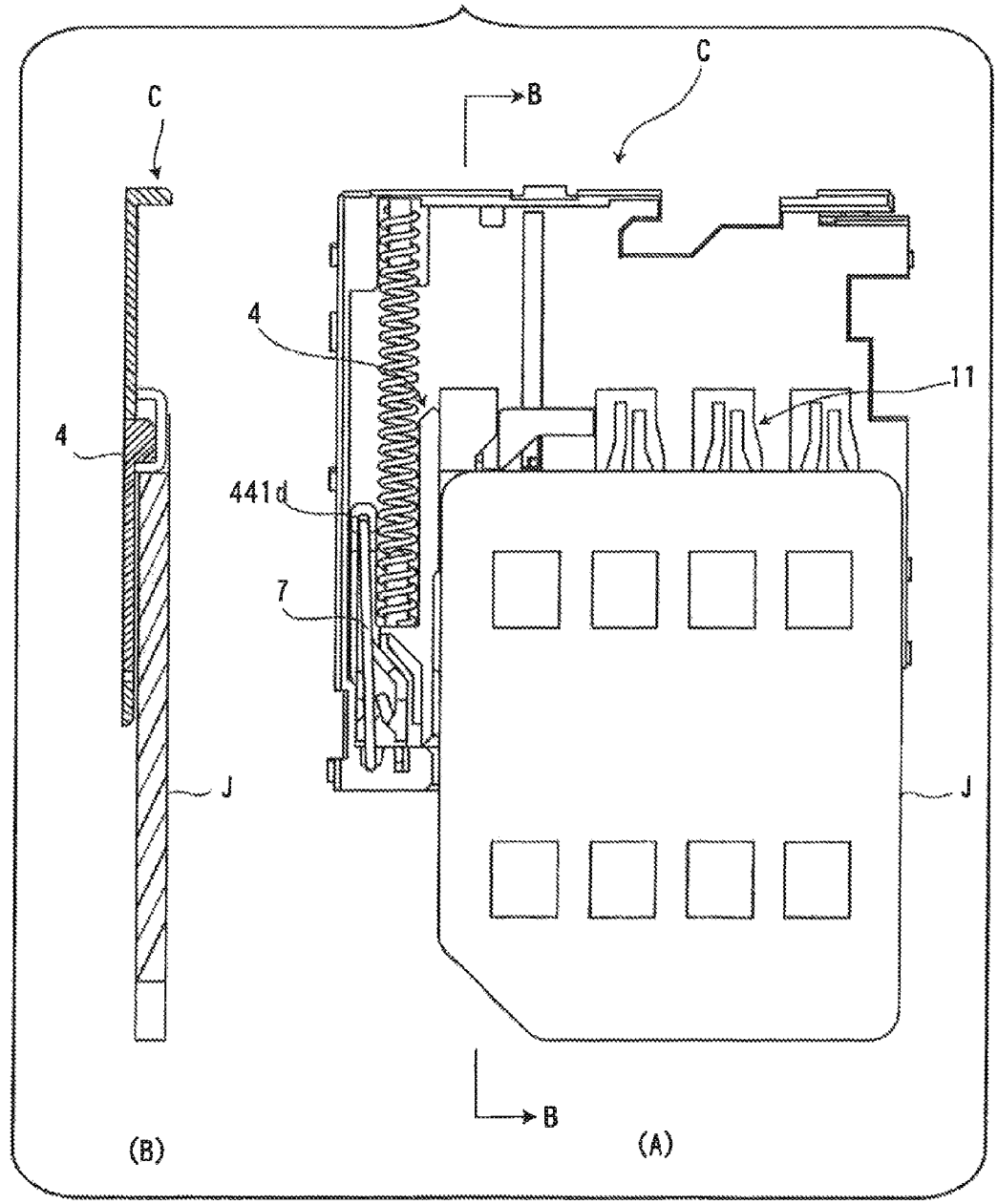
FIG. 6A is a plan view of the card connector according to the invention in which a pushing force against the card is released after the card is improperly inserted.
FIG. 6B is a section view of the card connector shown in FIG. 6A.

Now with reference to FIGS. 6A and 6B, operation of the card connector C according to the invention is discussed, when a force of the card J against the stopper 5, as shown in FIGS. 5A and 5B, is released.

The slider 4 moves up to the position where the cam pin 7 returns up to the ejection position point 441d. At this moment, the card J is urged out from the card receiving passageway 11 by the slider 4.

As shown in FIG. 6A and 6B, when the card J is improperly inserted into the card connector C according to the invention, not only does the card J not enter the deepest position in the card receiving passageway 11, but the card J is urged out of the card receiving passageway 11. For this reason, it is easily determined that the card J is not inserted properly.

Incidentally, FIGS. 5A through 6B show the card J being improperly inserted into the card connector according to the invention, in which the card J is reversed with respect to top and bottom and front and back when properly positioned. However, even if the card J is improperly positioned (for instance, the card J is inserted up-side down), movement of the improperly positioned card J is prohibited. Accordingly, the card J is urged out of the card receiving passageway 11.

In the embodiment shown, the coil spring 6 is only one example of an urging member according to the invention. The invention is not limited to this. Rather, the urging member may be, for example, a leaf spring or a rubber member.

In addition, the micro SIM card, shown as an example of the card in embodiment, may be replaced by other types of cards. The card may be, for example, an IC card typified by SD card. In addition, the number of the contacts may be other than six.

Further, in the card connector according to the above-described embodiment, the housing supports the cam pin and the slider includes the cam follower. However the housing may include the cam follower and the slider may support the cam pin.

Furthermore, the card connector according to the above-described embodiment has the push-push type eject mechanism. However, the invention is not limited this. The card connector may be, for example, a type in which a card is pushed out by pressing an eject button.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A card connector comprising:
   a housing having a front wall, a rear wall, and a card receiving passageway formed therein;
   contacts in the housing;
   a slider being slidable between the front wall and the rear wall; and
   a substantially U-shaped stopper straddling a portion of the slider, and including
   end sections positioned adjacent to the slider, forming a space between one of the end sections and the portion of the slider, and one of the end sections having a height substantially equal to the thickness of an insertable card.

2. The card connector according to claim 1, further comprising an urging member biasing the slider away from the rear wall.

3. The card connector according to claim 2 further comprising a cam pin supported by the housing and engageable with the slider.

4. The card connector according to claim 3, wherein the slider includes a cam follower into which the cam pin fits.

5. The card connector according to claim 4, wherein the cam follower guides the cam pin between a plurality of position points along the cam follower.

6. The card connector according to claim 5, wherein one of the plurality of position points moves the slider into a locked position.

7. The card connector according to claim 6, wherein another one of the plurality of position points moves the slider into the locked position.

8. The card connector according to claim 1, wherein the stopper is made of metal.

9. The card connector according to claim 1, further comprising a shell attached to and covering the housing.

10. The card connector according to claim 1, further comprising a card insertion passageway located at one end of the card receiving passageway along the front wall.

11. The card connector according to claim 1, wherein the housing includes a guide groove extending between the front wall and the rear wall.

12. The card connector according to claim 11, further comprising a projection disposed on the slider and projecting into the guide groove.

13. The card connector according to claim 1, wherein the rear wall includes a restraining wall to abut the slider or the stopper when the card is positioned in the card receiving passageway.

14. The card connector according to claim 13, wherein the slider includes a slider main body and a push section that extends from the slider main body.

15. The card connector according to claim 14, wherein the push section is engageable with the card when inserted into the card receiving passageway and the restraining wall.

16. The card connector according to claim 15, wherein the push section moves the slider toward the restraining wall when the card is inserted into the card receiving passageway and pushes the push section.

17. The card connector according to claim 1, wherein the height of one of the stopper end sections is substantially equal to the height of an insertable card.

* * * * *